3,515,771
HEAT RESISTANT NATURAL RUBBER COMPOSITIONS COMPRISING MORPHOLINE DISULFIDE AND AROMATIC AMINES

Hrishikesh Chandra Roy, Planegg, near Munich, Germany, assignor to Metzeler A.G., Munich, Germany
No Drawing. Filed May 4, 1967, Ser. No. 636,029
Int. Cl. C08c 11/46, 11/52
U.S. Cl. 260—788                                6 Claims

ABSTRACT OF THE DISCLOSURE

A natural rubber stock that contains elementary sulfur and N-dicyclohexyl-2-benzothiazylsulfenamide is improved by adding morpholine disulfide together with a metal inhibitor and aging resistant agent. The metal inhibitor may be mercaptobenzimidazole. The inhibitor may also be applied in combination with the age resistor. The two may be combined for instance, in the ratio of 1 to 1. The aging properties of natural rubber, particularly during heat build-up are substantially improved.

BACKGROUND OF THE INVENTION

Synthetic elastomers are superior to natural rubber in their properties in several specific areas. The overall performance of natural rubber, however, is still not yet equalled by synthetic elastomers. A large part of natural rubber is therefore used for making vehicle tires, particularly treads and sidewalls of truck tires, while for similar parts in passenger cars natural rubber has been replaced by other materials. For the carcass of truck and passenger car tires natural rubber is nevertheless still being used together with other materials.

The problem has therefore existed for a long time to improve the specific inferior properties of natural rubber by chemical modification of the compounding recipes in order to permit full use of the more desirable properties of the natural rubber. It is well known that natural rubber after working has a very high notch strength and develops less heat in case of dynamic tests than Buna rubber and other synthetic elastomers. In this connection attention must also be given to the natural viscosity (adhesiveness) which is of importance in working the rubber. These properties are critical in case of truck tires and high speed tires. They are behind the persistence of the tire industry to continue use of natural rubber.

Thus, it is a frequent occurrence that tires for trucks or racing cars develop a high heat build-up which obliterates all of the desirable properties of the natural rubber. Not infrequently, temperatures between 100 and 130° C. occur in the tread edges even in normal use. To meet this phenomenon it is necessary to improve the heat resistance of the vulcanized mixture.

It has already been proposed to inhibit the detrimental effect of metal traces present in the rubber by incorporating therein either mercaptobenzimidazole or an age resistor that contains this metal inhibitor, for instance, in the ratio of 1 to 1 or to use diphenyl paraphenylenediamine. The age resistor may, for instance, be of the type of a phenylenediamine or phenolic base composition. Well known compounds of this kind are "Nonox CGP" and "Nonox CNS" made by Imperial Chemical Industries of Great Britain. "Nonox CGP" is a mixture of 2-mercaptobenzimidazole and N-phenyl - N' - cyclohexyl - p-phenylenediamine. "Nonox CNS" is a mixture of 2-mercaptobenzimidazole and an age resistor on a phenolic base. The action of these agents in the presence of iron, copper and manganese in the elastomer has a beneficial catalytic effect by inhibiting the oxidation process, thus preventing the breakdown of the molecular chain which in turn leads to a depolymerization of the elastomer.

Although these additions results in an improvement of the heat resistance in case of prolonged exposure to air, at high temperature which is accomplished can not yet be considered entirely satisfactory. Actually, in the light of the tests that follow it appears that the prevailing opinion has attributed too much of an effect on heat resistance to the various known anti-oxidants, anti-ozonates and inhibitors.

SUMMARY OF THE INVENTION

It is therefore an object of the invention to improve the aging properties of natural rubber, in particular its heat resistance. A more specific object is to improve these properties in case of a sulfur containing natural rubbers and also containing an accelerator such as N-dicyclohexyl-2-benzothiazylsulfenamide together with a metal inhibitor and one of the common age resistors.

These and other objects, which will appear from a reading of the specification, are accomplished by a natural rubber stock wherein there is included morpholine disulfide together with a metal inhibitor and at least one age resistor compound.

Preferably, the metal inhibitor is mercaptobenzimidazole. The age resistor may contain the mercaptobenzimidazole or may contain additional amounts thereof in one combined composition, preferably in the ratio 1 to 1.

The age resistor may for instance, be a blend of mercaptobenzimidazole with a phenylenediamine or phenolic base age resistor compound. Also diphenyl paraphenylenediamine may be used together with other age resistors.

DESCRIPTION OF THE PREFERRED EMBODIMENTS

In the following comparative tests are furnished between various compositions showing additions other than those of the inventive combination and compositions coming under the scope of the invention.

The Group I compositions illustrate the use of age resistors in a natural rubber composition containing sulfur, carbon black, N-dicyclohexyl-2-benzothiazylsulfenamide, and other conventional modifiers.

The Group II compositions show the addition of mercaptobenzimidazole to Group I formulations.

The Group III compositions illustrate the use of age resistors that contain mercaptobenzimidazole in their composition.

The Group IV compositions illustrate the compositions of the invention. These may be considered the specific examples of the present application.

Group I compositions

| Master batch: | Parts by weight in kg. |
|---|---|
| Natural rubber | 100.00 |
| Oil (softener) | 2.50 |
| Zinc oxide | 5.00 |
| Stearic acid | 3.00 |
| Diphenylnitrosamine (retarder) | 1.00 |
| Combined age resistors [1] | 2.70 |
| Zinc salt of pentachlorthiophenols (depolymerizer) | 0.15 |
| Carbon black (ISAF=Intermediate super abrasion furnace) | 40.00 |
| Total | 154.35 |

[1] N-phenyl-N'-cyclohexyl - p - phenylenediamine or N-phenyl-N' - isopropyl - p - phenylenediamine+phenylalphanaphthylamine+phenylbetanaphthylamine (1–3 parts by weight of each diamine and 0.5 to 1 part of each naphthylamine).

| Final composition: | Parts by weight |
|---|---|
| Master batch | 154.35 |
| Sulfur | 2.50 |
| N-dicyclohexyl-2-benzothiazylsulfenamide | 0.50 |

Tests: Mooney-initial Vulcanization, 6/25.

|  | Normal tests | | | Test after aging for 3 days at 100° C. | | |
|---|---|---|---|---|---|---|
|  | Vulcanizations, time at 135° C. | | | | | |
|  | 60' | 90' | 120' | 60' | 90' | 120' |
| Modulus at 300%, kg./cm.² | 96 | 102 | 98 | | | |
| Modulus at 500%, kg./cm.² | 226 | 234 | 228 | | | |
| Tensile strength, kg./cm.² | 270 | 260 | 247 | 53 | 39 | 43 |
| Elongation, percent | 570 | 545 | 530 | 205 | 165 | 175 |
| Shore-hardness A | 57 | 60 | 60 | 57 | 60 | 60 |
| Resilience, percent | 52 | 49 | 48 | 43 | 39 | 40 |
| Notch strength, kg./cm | 34 | 32 | 24 | 14 | 22 | 15 |
| Tear strength, kg./cm | 90 | 97 | 102 | 49 | 61 | 62 |
| Abrasion, mg./min | | 6 | | | 49 | |
| Modulus of elasticity, kg./cm.² | | 71 | | | | |
| Hysteresis, percent | | 26 | | | | |
| Creep test: elongation in percent: | | | | | | |
| After 2 hours | | 9 | | | | |
| After 3 hours | | 32 | | | | |
| After 5 hours | | 104 | | | | |

These just-described compositions may be considered the starting point of the development. As already indicated it has been proposed to add a metal inhibitor to this type of composition to offset the detrimental effect of metal traces present in the natural rubber. Such a metal inhibitor is, for instance, mercaptobenzimidazole, the addition of which is illustrated in the following series of compositions in which the same master batch and therefore also the same age resistors are used as in the Group I compositions.

GROUP II COMPOSITIONS

|  | A | B | C |
|---|---|---|---|
| Master batch (same as in Group I) | 154.35 | 154.35 | 154.35 |
| Mercaptobenzimidazole | 1.0 | 1.5 | 2.0 |
| Sulfur | 2.5 | 2.5 | 2.5 |
| N-dicyclohexyl-2-benzothiazylsulfenamide | 0.4 | 0.4 | 0.4 |

Certain variations of the additives in the Group II compositions are permissible, as appears from the following range:

Mercaptobenzimidazole, 1.0 to 3.0 parts.
Sulfur, 2.0 to 3.0 parts.
N-dicyclohexyl-2-benzothiazyl-sulfenamide, 0.4 to 0.75 part.

Tests:

STANDARD TESTS

|  | A | | | B | | | C | | |
|---|---|---|---|---|---|---|---|---|---|
|  | Mooney, initial vulcanization | | | | | | | | |
|  | 7/17 | | | 8/14 | | | 4/12 | | |
|  | Vulcanization time at 135° C. | | | | | | | | |
|  | 30' | 60' | 90' | 30' | 60' | 90' | 30' | 60' | 90' |
| Modulus at 300%, kg./cm.² | 57 | 92 | 94 | 59 | 84 | 89 | 60 | 83 | 86 |
| Modulus at 500%, kg./cm.² | 154 | 215 | 220 | 160 | 205 | 214 | 156 | 202 | 206 |
| Tensile strength, kg./cm.² | 205 | 270 | 265 | 215 | 252 | 265 | 222 | 260 | 256 |
| Elongation, percent | 590 | 590 | 575 | 595 | 585 | 575 | 600 | 595 | 585 |
| Shore hardness A | 52 | 61 | 60 | 55 | 58 | 60 | 55 | 59 | 60 |
| Resilience, percent | 46 | 49 | 49 | 46 | 49 | 47 | 45 | 46 | 46 |
| Notch strength, kg./cm | 48 | 37 | 32 | 40 | 48 | 34 | 34 | 54 | 32 |
| Tear strength, kg./cm | 80 | 89 | 83 | 84 | 104 | 94 | 79 | 93 | 87 |
| Creep test: elongation in percent: | | | | | | | | | |
| After 2 hours | | 23 | 8 | | 9 | 8 | | 23 | 9 |
| After 3 hours | | 41 | 16 | | 22 | 14 | | 37 | 19 |
| After 5 hours | | 100 | 47 | | 47 | 34 | | 54 | 27 |

These standard tests of the vulcanized Group II compositions A, B and C confirm that addition of mercaptobenzimidazole improves the aging properties of an elastomer over those obtained in standard, that is, non-aged tests of the Group I formulations.

TEST AFTER AIR AGING FOR 3 DAYS AT 100° C.

|  | A | | | B | | | C | | |
|---|---|---|---|---|---|---|---|---|---|
|  | Vulcanizations, time at 135° C. | | | | | | | | |
|  | 30' | 60' | 90' | 30' | 60' | 90' | 30' | 60' | 90' |
| Modulus at 300%, kg./cm.² | | 121 | | 120 | 120 | 121 | 120 | 130 | 126 |
| Modulus at 500%, kg./cm.² | | | | | | | | | |
| Tensile strength, kg./cm.² | 89 | 134 | 122 | 195 | 160 | 124 | 210 | 174 | 168 |
| Elongation, percent | 246 | 320 | 300 | 430 | 380 | 305 | 470 | 390 | 380 |
| Shore hardness, A | 60 | 61 | 62 | 60 | 61 | 61 | 61 | 61 | 61 |
| Resilience, percent | 43 | 42 | 41 | 43 | 41 | 43 | 41 | 40 | 38 |
| Notch strength, kg./cm | 16 | 19 | 19 | 19 | 19 | 15 | 18 | 29 | 21 |
| Tear strength, kg./cm | 67 | 68 | 61 | 78 | 76 | 77 | 76 | 85 | 61 |

The following Group III compositions illustrate the addition of special age resistors which, within their composition contain mercaptobenzimidazole. The compound used as age resistor was "Nonox CGP.," which is a mixture of mercaptobenzimidazole and N-phenyl-N'-cyclohexyl-p-phenylenediamine in a ratio of 1:1. There is furthermore added a modifier known under the trade name "Wingstay 100," which is diphenylparaphenylenediamine.

Certain variations of the additives used in Group III are possible as appears from the following range:

Nonox CGP, 0.0 to 2.0 parts.
Wingstay 100, 0.0 to 2.0 parts.
Sulfur, 2.0 to 3.0 parts.
N-dicyclohexyl-2-benzothiazylsulfenamide, 0.4 to 0.75 part.

GROUP III COMPOSITIONS

|  | D | E | F | G | H | J |
|---|---|---|---|---|---|---|
| Master batch (same as in Group I) | 154.35 | 154.35 | 154.35 | 154.35 | 15.435 | 154.35 |
| Nonox CGP | 1.0 | 1.5 | 2.0 |  |  |  |
| Wingstay 100 |  |  |  | 1.0 | 1.5 | 2.0 |
| Sulfur | 2.5 | 2.5 | 2.5 | 2.5 | 2.5 | 2.5 |
| N-dicyclohexyl-2-benzothiazylsulfenamide | 0.4 | 0.4 | 0.4 | 0.4 | 0.4 | 0.4 |

STANDARD TESTS

|  | D | | | E | | | F | | |
|---|---|---|---|---|---|---|---|---|---|
|  | Mooney, initial vulcanization | | | | | | | | |
|  | 8/22 | | | 6/21 | | | 6/20 | | |
|  | Vulcanization, time at 135° C. | | | | | | | | |
|  | 30' | 60' | 90' | 30' | 60' | 90' | 30' | 60' | 90' |
| Modulus at 300%, kg./cm.² | 62 | 103 | 107 | 61 | 92 | 100 | 64 | 97 | 99 |
| Modulus at 500%, kg./cm.² | 166 | 235 | 244 | 162 | 220 | 228 | 168 | 230 | 227 |
| Tensile strength, kg./cm.² | 230 | 262 | 282 | 228 | 274 | 260 | 245 | 281 | 270 |
| Elongation, percent | 615 | 545 | 565 | 615 | 585 | 550 | 640 | 590 | 575 |
| Shore-hardness A | 54 | 60 | 61 | 56 | 60 | 61 | 53 | 61 | 60 |
| Resilience, percent | 41 | 46 | 44 | 46 | 47 | 45 | 44 | 48 | 47 |
| Notch strength, kg./cm. | 55 | 33 | 26 | 38 | 45 | 28 | 36 | 37 | 31 |
| Tear strength, kg./cm. | 82 | 112 | 113 | 82 | 114 | 99 | 80 | 120 | 102 |

TESTS AFTER AIR AGING FOR 3 DAYS AT 100° C.

|  | D | | | E | | | F | | |
|---|---|---|---|---|---|---|---|---|---|
|  | Vulcanization, time at 135° C. | | | | | | | | |
|  | 30' | 60' | 90' | 30' | 60' | 90' | 30' | 60' | 90' |
| Modulus at 300%, kg./cm.² |  |  |  |  | 110 |  |  |  |  |
| Modulus at 500%, kg./cm.² |  |  |  |  |  |  |  |  |  |
| Tensile strength, kg./cm.² | 65 | 61 | 44 | 98 | 117 | 57 | 86 | 91 | 84 |
| Elongation, percent | 205 | 200 | 155 | 275 | 305 | 195 | 245 | 260 | 235 |
| Shore-hardness A | 60 | 60 | 62 | 60 | 60 | 60 | 60 | 60 | 60 |
| Resilience, percent | 42 | 37 | 36 | 40 | 41 | 39 | 42 | 41 | 38 |
| Notch strength, kg./cm. | 17 | 18 | 20 | 18 | 20 | 21 | 21 | 17 | 20 |
| Tear strength, kg./cm. | 70 | 54 | 67 | 68 | 64 | 55 | 75 | 62 | 72 |

STANDARD TESTS

|  | G | | | H | | | J | | |
|---|---|---|---|---|---|---|---|---|---|
|  | Mooney, initial vulcanization | | | | | | | | |
|  | 8/30 | | | 7/26 | | | 6/30 | | |
|  | Vulcanization, time at 135° C. | | | | | | | | |
|  | 30' | 60' | 90' | 30' | 60' | 90' | 30' | 60' | 90' |
| Modulus at 300%, kg./cm.² | 35 | 96 | 105 | 31 | 91 | 104 | 34 | 93 | 103 |
| Modulus at 500%, kg./cm.² | 103 | 224 | 236 | 93 | 214 | 239 | 98 | 220 | 234 |
| Tensile strength, kg./cm.² | 128 | 275 | 265 | 121 | 280 | 270 | 146 | 278 | 270 |
| Elongation, percent | 565 | 585 | 550 | 565 | 605 | 555 | 610 | 595 | 560 |
| Shore hardness A | 46 | 59 | 60 | 46 | 57 | 60 | 47 | 59 | 60 |
| Resilience, percent | 44 | 48 | 47 | 44 | 49 | 47 | 42 | 48 | 47 |
| Notch strength, kg./cm. |  | 41 | 23 | 6 | 40 | 33 | 13 | 38 | 27 |
| Tear strength, kg./cm. | 35 | 118 | 116 | 47 | 105 | 101 | 51 | 94 | 112 |

TESTS AFTER 3 DAYS AIR AGING AT 100° C.

|  | G | | | H | | | J | | |
|---|---|---|---|---|---|---|---|---|---|
|  | Vulcanization, time at 135° C. | | | | | | | | |
|  | 30' | 60' | 90' | 30' | 60' | 90' | 30' | 60' | 90' |
| Modulus at 300%, kg./cm.² |  |  |  |  |  |  |  |  |  |
| Modulus at 500%, kg./cm.² |  |  |  |  |  |  |  |  |  |
| Tensile strength, kg./cm.² | 43 | 67 | 53 | 45 | 74 | 65 | 41 | 86 | 78 |
| Elongation, percent | 205 | 235 | 175 | 230 | 255 | 195 | 215 | 270 | 230 |
| Shore hardness A | 52 | 57 | 60 | 52 | 56 | 58 | 52 | 57 | 58 |
| Resilience, percent | 38 | 37 | 40 | 38 | 38 | 37 | 37 | 37 | 38 |
| Notch strength, kg./cm. | 19 | 14 | 18 | 14 | 13 | 15 | 16 | 13 | 10 |
| Tear strength, kg./cm. | 48 | 62 | 51 | 49 | 74 | 56 | 48 | 70 | 68 |

As appears with rubber compositions containing Nonox CGP and/or diphenyl-para-phenylenediamine one gets improved results just as the use of a mercaptobenzimidazole as a separate additive also results in improvements of the Group II compounds. These improvements relate to the higher heat resistance during air aging. However, the results can still not be considered fully satisfactory. This indicates, as already mentioned, that the beneficial effect of conventional anti-oxidizing and anti-ozone agents and inhibitors appear overestimated.

However, it is known that polysulfide bonds are not as stable upon aging of the rubber as monosulfide or carbon to carbon bonds and it must be emphasized that none of these possible bonds have proven uniformly stable under all aging conditions in air, oxygen and ozone.

The invention as briefly summarized before, therefore, solves the problem of improving the aging qualities of a rubber stock such as set forth in the Group I series of compositions by adding morpholine disulfide together with a metal inhibitor and an age resistor. The latter may be combined with the inhibitor as has been explained above. There may in particular be an age resistor composition containing mercaptobenzimidazole, such as "Nonox CGP" or "Nonox CNS," which two materials have been identified before and which contain the age resistor and metal inhibitor in the ratio of 1 to 1. There may also be used diphenyl-paraphenylendiamine as a further modifier. The age resistor that is combined with the mercaptobenzimidazole may be a phenylenediamine.

Without any intention to be committed to a particular theory the following discussion of the chemistry of the reaction may be helpful. It may be assumed that morpholine disulfide when used in natural rubber compositions results in fewer polysulfide bonds and more carbon to carbon bonds. At the same time it appears that the admixture of the morpholine disulfide reduces the number of monosulfide bonds (S—C—S bonds). Considering its physical properties it can also be presumed that morpholine disulfide will form a secondary alkyl amine in the mixture which later will act as a good anti-oxidizing and anti-ozone agent. It is also possible that the vulcanization of natural rubber compositions containing morpholine disulfide may take place through dimerizing of the formed free hydrocarbon radicals or possibly also through a crosslinking reaction of the liberated sulfur. This appears justified on the basis of the standard reactions when applied to a composition as follows:

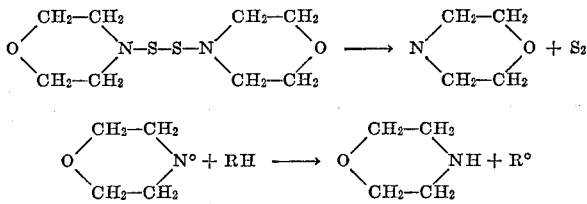

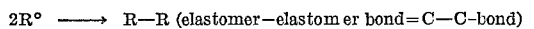
2R° ⟶ R—R (elastomer—elastomer bond = C—C-bond)

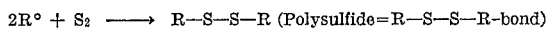
2R° + S₂ ⟶ R—S—S—R (Polysulfide = R—S—S—R-bond)

The following compositions illustrate the invention wherein morpholine disulfide is added in addition to mercaptobenzimidazole and an anti-aging composition. Products such as "Nonox CGP" in which the mercaptobenzimidazole has already been incorporated may be used as all or part of the age-resistor.

Part of the elementary sulfur of the original composition used in Group I has been replaced in Group IV by morpholine disulfide.

GROUP IV COMPOSITIONS

Master batch: Parts by weight in kg.

| | |
|---|---|
| Natural rubber | 100.00 |
| Oil (softener) | 2.50 |
| Zinc oxide | 5.00 |
| Stearic acid | 3.00 |
| Diphenylnitrosamine (retarder) | 1.00 |
| Combined age resistors [1] | 2.70 |
| Zinc salt of pentachlorothiophenol (depolymerizer) | 0.15 |
| Carbon black | 40.00 |
| | 154.35 |

[1] See Group I compositions for particulars.

FINAL FORMULATIONS

| | A | B | C |
|---|---|---|---|
| Master batch | 154.35 | 154.35 | 154.35 |
| Nonox CGP | 1.0 | 2.0 | |
| Diphenyl-para-phenylenediamine | | | 1.0 |
| Morpholine disulfide | 1.0 | 1.0 | 1.0 |
| Sulfur | 1.5 | 1.5 | 1.5 |
| N-dicyclohexyl-2-benzothiazylsulfenamide | 0.4 | 0.4 | 0.4 |

| | D | E | F |
|---|---|---|---|
| Master batch | 154.35 | 154.35 | 154.35 |
| Nonox CGP | 1.0 | 2.0 | |
| Diphenyl-para-phenylenediamine | | | 1.0 |
| Morpholine disulfide | 1.25 | 1.25 | 1.25 |
| Sulfur | 1.5 | 1.5 | 1.5 |
| N-dicyclohexyl-2-benzothiazylsulfenamide | 0.4 | 0.4 | 0.4 |

| | G | H | J |
|---|---|---|---|
| Master batch | 154.35 | 154.35 | 154.35 |
| Nonox CGP | | | |
| Diphenyl-para-phenylenediamine | | | |
| Mercaptobenzimidazole | | | 1.0 |
| Morpholine disulfide | 1.0 | 1.25 | 1.25 |
| Sulfur | 1.5 | 1.5 | 1.5 |
| N-dicyclohexyl-2-benzothiazylsulfenamide | 0.4 | 0.4 | 0.5 |

Certain variations in the amounts of the compounds of Group IV are possible, as appears from the following ranges:

Master batch (in parts by weight relative to 100):

| | |
|---|---|
| Oil | 2.0 to 10.0 |
| Zinc oxide | 2.5 to 5.0 |
| Stearic acid | 1.0 to 3.0 |
| Diphenylnitrosoaniline | 0.5 to 1.0 |
| Combined age resistors | 2.0 to 5.0 |
| Zinc salt of pentachlorothiophenol | 0.1 to 0.3 |

Individual batches:

| | |
|---|---|
| Nonox CGP | 0.0 to 3.0 |
| Diphenyl-p-phenylenediamine | 0.0 to 3.0 |
| Morpholine disulfide | 0.75 to 3.0 |
| Sulfur | 0.75 to 1.5 |
| N-dicyclohexyl-2-benzothiazylsulfenamide | 0.4 to 0.75 |
| Mercaptobenzimidazole (if not present in the combined age resistor agent) | 1.0 to 3.0 |

STANDARD TESTS—A

Mooney, initial vulcanization, 10/21.5

| | Vulcanizations, time at 135° C. | | | |
|---|---|---|---|---|
| | 30' | 60' | 90' | 120' |
| Modulus at 300%, kg./cm.² | 66 | 95 | 97 | 93 |
| Modulus at 500%, kg./cm.² | 169 | 224 | 224 | 202 |
| Tensile strength, kg./cm.³ | 241 | 262 | 264 | 262 |
| Elongation, percent | 620 | 555 | 560 | 565 |
| Shore hardness A | 56 | 60 | 59 | 57 |
| Resilience, percent | 48 | 51 | 47 | 50 |
| Notch strength, kg./cm | 30 | 42 | 29 | 13 |
| Tear strength, kg./cm | 85 | 104 | 91 | 85 |
| Abrasion, mg./min | | 4.7 | 1.6 | |
| Modulus of elasticity, kg./cm.² | | 62 | 65 | |
| Hysteresis, percent | | 22 | 21 | |
| Creep test, elongation in percent: | | | | |
| After 2 hours | | 23 | 3 | |
| After 3 hours | | 37 | 7 | |
| After 5 hours | | 63 | 11 | |

TESTS AFTER 3-DAY AIR-AGING AT 100° C.—A

| | Vulcanizations, time at 135° C. | | | |
|---|---|---|---|---|
| | 30′ | 60′ | 90′ | 120′ |
| Modulus at 300%, kg./cm.² | 120/56 | 124/93 | 127/93 | 129/87 |
| Modulus at 500%, kg./cm.² | 153 | 219 | 225 | 211 |
| Tensile strength, kg./cm.² | 161/240 | 180/274 | 169/265 | 159/236 |
| Elongation, percent | 380/640 | 405/580 | 380/570 | 350/540 |
| Shore hardness A | 61/54 | 60/60 | 59/60 | 60/59 |
| Resilience, percent | 40/48 | 42/49 | 40/48 | 40/49 |
| Notch strength, kg./cm | 19/36 | 18/33 | 17/33 | 19/33 |
| Tear strength, kg./cm | 82 | 77 | 78 | 77 |
| Abrasion, mg./min | | 43 | 36 | |

STANDARD TESTS—B

Mooney, initial vulcanization, 7/22

| | Vulcanizations, time at 135° C. | | | |
|---|---|---|---|---|
| | 30′ | 60′ | 90′ | 120′ |
| Modulus at 300%, kg./cm.² | 66 | 77 | 82 | 75 |
| Modulus at 500%, kg./cm.² | 165 | 192 | 197 | 187 |
| Tensile strength, kg./cm.² | 255 | 259 | 264 | 250 |
| Elongation, percent | 650 | 605 | 605 | 595 |
| Shore hardness A | 55 | 59 | 60 | 56 |
| Resilience, percent | 46 | 48 | 48 | 47 |
| Notch strength, kg./cm | 46 | 38 | 30 | 27 |
| Tear strength, kg./cm | 89 | 96 | 102 | 91 |
| Abrasion, mg./min | | 1.0 | 0.8 | |
| Modulus of elasticity, kg./cm.² | | 69 | 64 | |
| Hysteresis, percent | | 21 | 22 | |
| Creep test, elongation in percent: | | | | |
| After 2 hours | | 25 | 5 | |
| After 3 hours | | 37 | 10 | |
| After 5 hours | | 60 | 23 | |

TESTS AFTER 3-DAY AIR-AGING AT 100° C.—B

| | Vulcanizations, time at 135° C. | | | |
|---|---|---|---|---|
| | 30′ | 60′ | 90′ | 120′ |
| Modulus at 300%, kg./cm.² | 122/64 | 119/89 | 119/86 | 119/84 |
| Modulus at 500%, kg./cm.² | 168 | 213 | 207 | 205 |
| Tensile strength, kg./cm.² | 205/240 | 192/270 | 193/256 | 195/250 |
| Elongation, percent | 465/620 | 425/590 | 425/580 | 450/580 |
| Shore hardness A | 64/54 | 58/61 | 60/60 | 62/59 |
| Resilience, percent | 40/49 | 40/48 | 41/47 | 41/47 |
| Notch strength, kg./cm | 23/42 | 27/45 | 20/30 | 16/33 |
| Tear strength, kg./cm | 78 | 78 | 90 | 63 |
| Abrasion, mg./min | | 29 | 35 | |

STANDARD TESTS—C

Mooney, initial vulcanization, 9/29.5

| | Vulcanizations, time at 135° C. | | | |
|---|---|---|---|---|
| | 30′ | 60′ | 90′ | 120′ |
| Modulus at 300%, kg./cm.² | 19 | 92 | 99 | 100 |
| Modulus at 500%, kg./cm.² | 57 | 216 | 229 | 230 |
| Tensile strength, kg./cm.² | 66 | 265 | 272 | 275 |
| Elongation, percent | 535 | 575 | 565 | 565 |
| Shore hardness A | 42 | 58 | 60 | 59 |
| Resilience, percent | 41 | 50 | 48 | 48 |
| Notch strength, kg./cm | 3 | 29 | 23 | 19 |
| Tear strength, kg./cm | 10 | 98 | 89 | 83 |
| Abrasion, mg./min | | 1.1 | 1.0 | |
| Modulus of elasticity, kg./cm.² | | 56 | 62 | |
| Hysteresis, percent | | 21 | 23 | |
| Creep test, elongation in percent: | | | | |
| After 2 hours | | 29 | 4 | |
| After 3 hours | | 47 | 7 | |
| After 5 hours | | 84 | 14 | |

TESTS AFTER 3-DAY AIR-AGING AT 100° C.—C

| | Vulcanizations, time at 135° C. | | | |
|---|---|---|---|---|
| | 30′ | 60′ | 90′ | 120′ |
| Modulus at 300%, kg./cm.² | 75/22 | 119/92 | 119/102 | 119/104 |
| Modulus at 500%, kg./cm.² | 66 | 215 | 204 | 235 |
| Tensile strength, kg./cm.² | 97/107 | 157/265 | 149/275 | 146/278 |
| Elongation, percent | 365/640 | 385/580 | 360/580 | 350/560 |
| Shore hardness A | 52/42 | 59/59 | 57/59 | 58/57 |
| Resilience, percent | 41/42 | 40/48 | 40/47 | 38/49 |
| Notch strength, kg./cm | 19/24 | 17/42 | 17/29 | 15/18 |
| Tear strength, kg./cm | 76 | 74 | 70 | 58 |
| Abrasion, mg./min | | 33 | 43 | |

STANDARD TESTS—D

Mooney, initial vulcanization, 14/21

| | Vulcanizations, time at 135° C. | | | |
|---|---|---|---|---|
| | 30′ | 60′ | 90′ | 120′ |
| Modulus at 300%, kg./cm.² | 65 | 89 | 90 | 95 |
| Modulus at 500%, kg./cm.² | 168 | 214 | 218 | 225 |
| Tensile strength, kg./cm.² | 242 | 264 | 266 | 248 |
| Elongation, percent | 625 | 575 | 570 | 525 |
| Shore hardness A | 53 | 58 | 60 | 59 |
| Resilience, percent | 51 | 51 | 50 | 52 |
| Notch strength, kg./cm | 54 | 34 | 22 | 18 |
| Tear strength, kg./cm | 78 | 103 | 104 | 82 |
| Abrasion, mg./min | | 1.4 | 1.0 | |
| Modulus of elasticity, kg./cm.² | | 69 | 66 | |
| Hysteresis, percent | | 21 | 21 | |
| Creep test, elongation in percent: | | | | |
| After 2 hours | | 23 | 4 | |
| After 3 hours | | 35 | 8 | |
| After 5 hours | | 75 | 19 | |

TESTS AFTER 3-DAY AIR-AGING AT 100° C.—D

| | Vulcanizations, time at 135° C. | | | |
|---|---|---|---|---|
| | 30′ | 60′ | 90′ | 120′ |
| Modulus at 300%, kg./cm.² | 131/61 | 136/100 | 149/101 | 144/100 |
| Modulus at 500%, kg./cm.² | 162 | 230 | 235 | 219 |
| Tensile strength, kg./cm.² | 192/240 | 184/274 | 154/269 | 158/276 |
| Elongation, percent | 410/640 | 385/570 | 320/560 | 320/570 |
| Shore hardness A | 61/55 | 63/62 | 62/60 | 60/60 |
| Resilience, percent | 47/46 | 46/48 | 44/45 | 45/47 |
| Notch strength, kg./cm | 15/41 | 15/33 | 17/21 | 16/29 |
| Tear strength, kg./cm | 58 | 60 | 66 | 78 |
| Abrasion, mg./min | | 22 | 21 | |

STANDARD TESTS—E

Mooney, initial vulcanization, 9/20.5

| | Vulcanizations, time at 135° C. | | | |
|---|---|---|---|---|
| | 30′ | 60′ | 90′ | 120′ |
| Modulus at 300%, kg./cm.² | 76 | 90 | 90 | 87 |
| Modulus at 500%, kg./cm.² | 191 | 214 | 212 | 208 |
| Tensile strength, kg./cm.² | 256 | 265 | 253 | 250 |
| Elongation, percent | 600 | 570 | 555 | 560 |
| Shore hardness A | 58 | 60 | 60 | 58 |
| Resilience, percent | 48 | 48 | 50 | 47 |
| Notch strength, kg./cm | 22 | 33 | 27 | 20 |
| Tear strength, kg./cm | 103 | 113 | 107 | 93 |
| Abrasion, mg./min | | 1.9 | 1.2 | |
| Modulus of elasticity, kg./cm.² | | 71 | 66 | |
| Hysteresis, percent | | 21 | 22 | |
| Creep test, elongation in percent: | | | | |
| After 2 hours | | 22 | 5 | |
| After 3 hours | | 32 | 9 | |
| After 5 hours | | 53 | 15 | |

TESTS AFTER 3-DAY AIR-AGING AT 100° C.—E

| | Vulcanizations, time at 135° C. | | | |
|---|---|---|---|---|
| | 30′ | 60′ | 90′ | 120′ |
| Modulus at 300%, kg./cm.² | 139/72 | 135/96 | 141/95 | 132/95 |
| Modulus at 500%, kg./cm.² | 184 | 225 | 228 | 230 |
| Tensile strength, kg./cm.² | 214/269 | 200/275 | 202/274 | 192/260 |
| Elongation, percent | 435/650 | 416/580 | 415/570 | 405/550 |
| Shore hardness A | 64/57 | 64/62 | 62/59 | 61/59 |
| Resilience, percent | 46/46 | 45/47 | 43/46 | 38/46 |
| Notch strength, kg./cm | 18/46 | 18/30 | 27/37 | 13/18 |
| Tear strength, kg./cm | 72 | 69 | 69 | 77 |
| Abrasion, mg./min | | 19 | 33 | |

STANDARD TESTS—F

Mooney, initial vulcanization, 13/29

| | Vulcanizations, time at 135° C. | | | |
|---|---|---|---|---|
| | 30′ | 60′ | 90′ | 120′ |
| Modulus at 300%, kg./cm.² | 19 | 94 | 110 | 104 |
| Modulus at 500%, kg./cm.² | 58 | 221 | 246 | 229 |
| Tensile strength, kg./cm.² | 114 | 280 | 257 | 255 |
| Elongation, percent | 690 | 575 | 510 | 525 |
| Shore hardness A | 40 | 57 | 62 | 58 |
| Resilience, percent | 42 | 52 | 50 | 50 |
| Notch strength, kg./cm | 3 | 28 | 13 | 19 |
| Tear strength, kg./cm | 13 | 100 | 113 | 81 |
| Abrasion, mg./min | | 0.8 | 1.1 | |
| Modulus of elasticity, kg./cm.² | | 63 | 65 | |
| Hysteresis, percent | | 21 | 21 | |
| Creep test, elongation in percent: | | | | |
| After 2 hours | | 16 | 4 | |
| After 3 hours | | 30 | 6 | |
| After 5 hours | | 59 | 23 | |

TESTS AFTER 3-DAY AIR-AGING AT 100° C.—F

| | Vulcanizations, time at 135° C. | | | |
|---|---|---|---|---|
| | 30' | 60' | 90' | 120' |
| Modulus at 300%, kg./cm.$^2$ | 97/22 | 123/104 | 129/112 | 139/112 |
| Modulus at 500%, kg./cm.$^2$ | 65 | 240 | 255 | 252 |
| Tensile strength, kg./cm.$^2$ | 122/100 | 176/280 | 170/279 | 179/265 |
| Elongation, percent | 355/610 | 395/570 | 365/540 | 350/520 |
| Shore hardness A | 55/38 | 60/59 | 60/60 | 58/59 |
| Resilience, percent | 46/42 | 43/51 | 42/48 | 40/48 |
| Notch strength, kg./cm | 9/23 | 20/27 | 14/30 | 19/22 |
| Tear strength, kg./cm | 60 | 65 | 57 | 56 |
| Abrasion, mg./min | | 30 | 31 | |

STANDARD TESTS—G

| | Mooney, initial vulcanization, ca. 25 | | | |
|---|---|---|---|---|
| | Vulcanizations, time at 135° C. | | | |
| | 30' | 60' | 90' | 120' |
| Modulus at 300%, kg./cm.$^2$ | 21 | 108 | 112 | 116 |
| Modulus at 500%, kg./cm.$^2$ | 63 | 250 | 251 | 259 |
| Tensile strength, kg./cm.$^2$ | 76 | 290 | 281 | 265 |
| Elongation, percent | 550 | 565 | 535 | 510 |
| Shore hardness A | 43 | 60 | 61 | 60 |
| Resilience, percent | 41 | 47 | 48 | 49 |
| Notch strength, kg./cm | | | 45 | 34 | 20 |
| Tear strength, kg./cm | 8 | 102 | 91 | 90 |
| Abrasion, mg./min | | | | |
| Modulus of elasticity, kg./cm.$^2$ | | | | |
| Hysteresis, percent | | | | |
| Creep test, elongation in percent: | | | | |
| After 2 hours | | | | |
| After 3 hours | | | | |
| After 5 hours | | | | |

TESTS AFTER 3-DAY AIR-AGING AT 100° C.—G

| | Vulcanizations, time at 135° C. | | | |
|---|---|---|---|---|
| | 30' | 60' | 90' | 120' |
| Modulus at 300%, kg./cm.$^2$ | | | | |
| Modulus at 500%, kg./cm.$^2$ | | | | |
| Tensile strength, kg./cm.$^2$ | | | 96 | 102 |
| Elongation, percent | | | 285 | 290 |
| Shore hardness A | | | 56 | 56 |
| Resilience, percent | | | 40 | 41 |
| Notch strength, kg./cm | | | 16 | 14 |
| Tear strength, kg./cm | | | 56 | 66 |
| Abrasion, mg./min | | | | |

STANDARD TESTS—H

| | Mooney, initial vulcanization, ca. 25 | | | |
|---|---|---|---|---|
| | Vulcanizations, time at at 135° C. | | | |
| | 30' | 60' | 90' | 120' |
| Modulus at 300%, kg./cm.$^2$ | 18 | 108 | 116 | 120 |
| Modulus at 500%, kg./cm.$^2$ | 52 | 248 | 259 | 260 |
| Tensile strength, kg./cm.$^2$ | 61 | 283 | 290 | 276 |
| Elongation, percent | 520 | 545 | 550 | 515 |
| Shore hardness A | 41 | 60 | 61 | 61 |
| Resilience, percent | 42 | 50 | 48 | 48 |
| Notch strength, kg./cm | | | 39 | 27 | 28 |
| Tear strength, kg./cm | 10 | 95 | 118 | 106 |
| Abrasion, mg./min | | | | |
| Modulus of elasticity, kg./cm.$^2$ | | | | |
| Hysteresis, percent | | | | |
| Creep test, elongation in percent: | | | | |
| After 2 hours | | | | |
| After 3 hours | | | | |
| After 5 hours | | | | |

TESTS AFTER 3-DAY AIR-AGING AT 100° C.—H

| | Vulcanizations, time at 135° C. | | | |
|---|---|---|---|---|
| | 30' | 60' | 90' | 120' |
| Modulus at 300%, kg./cm.$^2$ | | | | |
| Modulus at 500%, kg./cm.$^2$ | | | | |
| Tensile strength, kg./cm.$^2$ | | | 110 | 88 |
| Elongation, percent | | | 300 | 255 |
| Shore hardness A | | | 58 | 60 |
| Resilience, percent | | | 43 | 40 |
| Notch strength, kg./cm | | | 16 | 14 |
| Tear strength, kg./cm | | | 70 | 65 |
| Abrasion, mg./min | | | | |

STANDARD TEST—J

| | Mooney, initial vulcanizations, t 5/22 | | | |
|---|---|---|---|---|
| | Vulcanizations, time at 135° C. | | | |
| | 30' | 60' | 90' | 120' |
| Modulus at 300%, kg./cm.$^2$ | 98 | 97 | | |
| Modulus at 500%, kg./cm.$^2$ | 229 | 228 | | |
| Tensile strength, kg./cm.$^2$ | 280 | 265 | | |
| Elongation, percent | 575 | 550 | | |
| Shore hardness A | 60 | 54 | | |
| Resilience, percent | 43 | 44 | | |
| Notch strength, kg./cm | | | | |
| Tear strength, kg./cm | | | | |
| Abrasion, mg./min | | | | |
| Modulus of elasticity, kg./cm.$^2$ | | | | |
| Hysteresis, percent | | | | |
| Creep test, elongation in percent: | | | | |
| After 2 hours | | | | |
| After 3 hours | | | | |
| After 5 hours | | | | |

TESTS AFTER 3-DAY AIR-AGING AT 100° C.—J

| | Vulcanizations, time at 135° C. | | | |
|---|---|---|---|---|
| | 30' | 60' | 90' | 120' |
| Modulus at 300%, kg./cm.$^2$ | 125 | 125 | | |
| Modulus at 500%, kg./cm.$^2$ | | | | |
| Tensile strength, kg./cm.$^2$ | 173 | 173 | | |
| Elongation, percent | 390 | 385 | | |
| Shore hardness A | 65 | 65 | | |
| Resilience, percent | 43 | 39 | | |
| Notch strength, kg./cm | | | | |
| Tear strength, kg./cm | | | | |
| Abrasion, mg./min | | | | |

Some of the aging tests have been carried out twice to show that the results are reproducible. The second figure in these entries relates to the better result.

As appears, the physical properties of the compositions of the invention prior to air-aging are superior to natural rubber compositions of the conventional type. For instance, the Mooney-scorch time is better, resulting in a greater margin of safety during working.

All these mixtures are rather uniform without a noticeable lowering of the physical properties after heating for 60 and 90 minutes. This would not be true for vulcanizates containing only sulfenamide accelerators, such as N-dicyclohexyl - 2 - benzothiazylsulfenamide, and elementary sulfur. While in these cases there is a delay of the Mooney-scorch action, heating for longer than 90 minutes lowers the test values, due to degradation of the rubber. All this is quite marked and shows an inherent weakness of the old system. Unsatisfactory physical properties result also from compositions G and H of Group IV in which the combined age resistor-metal inhibitor compound had been omitted.

The vulcanization system of Group IV compounds in general is not affected by the shortcomings of the conventional vulcanization system. Rather, the system of the invention shows remarkably good physical properties also after air-aging. The decrease of the physical level with continued age hardening is not only smaller but takes place at a lower and more uniform pace. This means that the vulcanizate has a better heat-resistance and is less subject to the deterioration of the natural rubber mixture by polymer changes (reversion). Furthermore, in this system, no bloom of the sulfur occurs, because its amount is kept within the solution range. The viscosity (adhesiveness) of the rubber which is so important for the working is fully retained in this system.

Thus, it appears that natural rubber can be made heat-resistant to a considerable degree by a suitable compounding mixture. This facilitates also the use of the so-called "Intermediate Super-Abrasive Furnace Black" (ISAF) and "Super-Abrasive Furnace Black" (SAF). The vulcanizing system of the Group IV compositions makes the use of such carbon blacks in natural rubber safe for subsequent working and thus contributes to improved properties of the vulcanizate, particularly abrasion resistance, in case of vehicle tires.

The following table shows ozone (A) and oxygen (B) aging tests for the purpose of a comparison between natural rubbers of the Group I and Group IV series.

(A) OZONE-AGING (125 PARTS OF OZONE PER 10⁸ PARTS OF AIR AT AT 25° C.

|  | Quality Hours | | | | | |
|---|---|---|---|---|---|---|
|  | 4 | 8 | 12 | 16 | 20 | 24 |
| Composition I: | | | | | | |
| 90′x135° C | 2(b) | 2(c) | 2(d) | 2(d) | 3(b) | 3(c) |
| 120′x135° C | 2(b) | 2(d) | 2(d) | 3(b) | 3(b) | 3(c) |
| Composition IV: | | | | | | |
| A 90′x135° C | 2(a) | 2(c) | 2(d) | 3(b) | 3(b) | 3(c) |
| 120′x135° C | 2(a) | 2(c) | 2(d) | 3(b) | 3(b) | 3(c) |
| B 90′x135° C | 1(b) | 2(c) | 2(d) | 2(d) | 2(d) | 3(b) |
| 120′x135° C | 1(b) | 2(c) | 2(d) | 3(b) | 3(b) | 3(c) |
| C 90′x135° C | 0 | 2(c) | 2(d) | 2(d) | 3(b) | 3(b) |
| 120′x135° C | 0 | 2(c) | 2(d) | 2(d) | 3(b) | 3(c) |
| D 90′x135° C | 1(b) | 2(d) | 2(d) | 3(b) | 3(b) | 3(c) |
| 120′x135° C | 1(b) | 2(d) | 2(d) | 2(d) | 2(d) | 3(b) |
| E 90′x135° C | 1(c) | 2(d) | 3(b) | 3(c) | 3(c) | ----- |
| 120′x135° C | 1(b) | 2(c) | 2(d) | 2(d) | ----- | ----- |
| F 90′x135° C | 1(b) | 2(d) | 2(d) | 3(b) | 3(b) | 3(c) |
| 120′x135° C | 1(b) | 2(d) | 2(d) | 3(b) | 3(c) | 3(c) |

NOTE.—The symbols of this table have the following meaning:
0 = no cracks.
1 = very fine cracks (hair line cracks visible only with 6× magnification).
2 = fine cracks (smaller than 1 mm.).
3 = medium cracks (cracks of the size up to 2 mm.).
(a) = number of cracks up to 8; cracks can be counted individually.
(b) = number of cracks up to 30.
(c) = many cracks, that is, up to about 120.
(d) = a multitude of cracks, that is, above about 120.

(B) OXYGEN AGING (72 HOURS AT 60° C. AND 20 AT 135° C.)

TEST I

|  | Vulcanizations, time at 135° C. | | |
|---|---|---|---|
|  | 60′ | 90′ | 120′ |
| Modulus at 300%, kg./cm.² | 70 | 116 | 116 |
| Modulus at 500%, kg./cm.² | 170 | 240 | ----- |
| Tensile strength, kg./cm.² | 210 | 250 | 215 |
| Elongation, percent | 580 | 525 | 465 |
| Shore hardness A | 55 | 61 | 63 |
| Resilience, percent | 38 | 42 | 41 |
| Notch strength, kg./cm | 35 | 25 | 9 |
| Tear strength, kg./cm | 98 | 84 | 64 |

TEST IV

|  | A | | | | B | | | |
|---|---|---|---|---|---|---|---|---|
|  | Vulcanizations, time at 135° C. | | | | | | | |
|  | 30′ | 60′ | 90′ | 120′ | 30′ | 60′ | 90′ | 120′ |
| Modulus at 300%, kg./cm.² | 69 | 104 | 112 | 114 | 74 | 104 | 112 | 112 |
| Modulus at 500%, kg./cm.² | 170 | 230 | 235 | 235 | 184 | 225 | 230 | 226 |
| Tensile strength, kg./cm.² | 224 | 259 | 255 | 246 | 245 | 255 | 244 | 240 |
| Elongation, percent | 615 | 565 | 535 | 535 | 615 | 555 | 525 | 525 |
| Shore hardness A | 57 | 64 | 63 | 63 | 60 | 65 | 65 | 65 |
| Resilience, percent | 47 | 51 | 50 | 47 | 47 | 48 | 45 | 47 |
| Notch strength, kg./cm | 43 | 42 | 27 | 18 | 33 | 27 | 39 | 20 |
| Tear strength, kg./cm | 100 | 110 | 93 | 104 | 95 | 108 | 114 | 97 |

|  | C | | | | D | | | |
|---|---|---|---|---|---|---|---|---|
|  | Vulcanizations, time at 135° C. | | | | | | | |
|  | 30′ | 60′ | 90′ | 120′ | 30′ | 60′ | 90′ | 120′ |
| Modulus at 300%, kg./cm.² | 18 | 85 | 115 | 118 | 23 | 110 | 124 | 118 |
| Modulus at 500%, kg./cm.² | ----- | 192 | 240 | ----- | 58 | 231 | ----- | 239 |
| Tensile strength, kg./cm.² | 48 | 240 | 257 | 230 | 79 | 260 | 255 | 245 |
| Elongation, percent | 490 | 495 | 525 | 505 | 580 | 555 | 500 | 510 |
| Shore hardness A | 40 | 58 | 63 | 64 | 40 | 65 | 65 | 64 |
| Resilience, percent | 35 | 44 | 48 | 46 | 38 | 52 | 50 | 51 |
| Notch strength, kg./cm | 6 | 42 | 31 | 26 | 4 | 29 | 24 | 28 |
| Tear strength, kg./cm | 10 | 88 | 110 | 84 | 112 | 110 | 80 | 83 |

|  | E | | | | F | | | |
|---|---|---|---|---|---|---|---|---|
|  | Vulcanizations, time 135° C. | | | | | | | |
|  | 30′ | 60′ | 90′ | 120′ | 30′ | 60′ | 90′ | 120′ |
| Modulus at 300%, kg./cm.² | 79 | 110 | 120 | 124 | 79 | 99 | 122 | 132 |
| Modulus at 500%, kg./cm.² | 180 | 230 | 240 | 240 | 179 | 205 | 249 | ----- |
| Tensile strength, kg./cm.² | 245 | 265 | 252 | 255 | 244 | 250 | 256 | 257 |
| Elongation, percent | 610 | 560 | 525 | 530 | 620 | 575 | 525 | 485 |
| Shore hardness A | 61 | 65 | 66 | 65 | 60 | 60 | 65 | 65 |
| Resilience, percent | 48 | 50 | 47 | 51 | 46 | 48 | 48 | 47 |
| Notch strength, kg./cm | 42 | 33 | 27 | 30 | 42 | 28 | 21 | 19 |
| Tear strength, kg./cm | 112 | 118 | 88 | 99 | 88 | 104 | 93 | 73 |

It is apparent from the aging of the natural rubber compositions of Group I in an ozone or oxygen atmosphere that the quality of the Group I compositions, for instance, for tire treads is not particularly low. Nevertheless, the compositions of Group IV are substantially improved above the Group I level although effects such as are discernible with the unaided eye are not particularly marked in the ozone tests.

Similiar conclusions apply in connection with the oxygen aging. Again, it appears that the results of the Group IV compositions are better than those of Group I compositions. These findings are confirmed by an analysis of the physical data of the above table. These data are based on static tests and do, therefore, not reveal the chemical structure of the system or the behavior under dynamic conditions. The anti-oxidant and the anti-ozonant agents in all these compositions prevent the formation of peroxides and ozonides. The conclusion seems therefore warranted that the vulcanizing system in connection with these age resistors and metal-inhibitors plays an important part in the stabilization against heat, oxygen and ozone.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A vulcanizable composition comprising natural rubber and the following additives:

Sulfur—in an amount of 0.75 to 1.5 parts
Morpholine disulfide—in an amount of 0.75 to 3.0 parts
Mercaptobenzimidazole—in an amount of 1.0 to 3.0 parts
N-phenyl-N′-cyclohexyl-p-phenylenediamine or N-phenyl-N′-isopropyl-p-phenylenediamine—in an amount of 1.0 to 3.0 parts
Phenyl-α-naphthylamine and phenyl-β-naphthylamine—in an amount of 0.5 to 1.0 part of each naphthylamine the said parts being parts by weight relative to 100 parts of natural rubber.

2. The composition of claim 1 wherein the said diamine and the said naphthylamines and the said mercaptobenzimidazole are added in a total amount of between 2.0 and 5.0 parts by weight per 100 parts of rubber.

3. The composition of claim 1 wherein sulfur is present in an amount of 1.5 parts and morpholine disulfide is present in an amount of 1.0 to 1.5 parts by weight.

4. The composition of claim 1 wherein diphenyl-p-phenylenediamine is added in an amount from 1.0 up to 3.0 parts by weight per 100 parts of rubber.

5. The composition of claim 1 wherein the mercaptobenzimidazole is added in one combined compound together with the said diamine and naphthylamines, the combined compound containing the mercaptobenzimidazole in a ratio of 1:1 relative to the diamine and naphthylamines.

6. The composition of claim 1 wherein N-dicyclohexyl-2-benzothiazylsulfenamide is added in an amount of between 0.4 and 0.75 part by weight per 100 parts of rubber.

References Cited

UNITED STATES PATENTS

| | | | |
|---|---|---|---|
| 1,942,790 | 1/1934 | Zaucker et al. | 260—788 |
| 2,727,014 | 12/1955 | Harbison | 260—41.5 |
| 2,754,216 | 7/1956 | Chenicek | 260—800 |
| 2,892,805 | 6/1959 | Tomlin et al. | 260—41.5 |
| 2,923,753 | 2/1960 | Leyland et al. | 260—752 |

FOREIGN PATENTS 208,683   7/1956   Australia.

DONALD E. CZAJA, Primary Examiner

R. A. WHITE, Assistant Examiner

U.S. Cl. X.R.

260—800, 809